United States Patent
Greenwood (12)

(10) Patent No.: US 6,522,626 B1
(45) Date of Patent: Feb. 18, 2003

(54) POWER LINE COMMUNICATIONS SYSTEM AND METHOD OF OPERATION THEREOF

(75) Inventor: Christopher John Greenwood, Nr Chippenham (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/281,490

(22) Filed: Mar. 30, 1999

(30) Foreign Application Priority Data

Dec. 15, 1998 (GB) .............................................. 9827601

(51) Int. Cl.$^7$ ................................................. H04J 11/00
(52) U.S. Cl. ........................ 370/208; 370/210; 375/346; 340/310.02
(58) Field of Search ................................ 370/203, 204, 370/208, 210, 343; 340/310.01, 310.02, 310.03; 375/285, 346; 379/93.01, 90.01

(56) References Cited

U.S. PATENT DOCUMENTS

| | | | | |
|---|---|---|---|---|
| 5,371,548 A | * | 12/1994 | Williams | ...................... 348/478 |
| 5,828,293 A | * | 10/1998 | Rickard | .................. 340/310.01 |
| 6,040,759 A | * | 3/2000 | Sanderson | ............. 340/310.01 |
| 6,130,918 A | * | 10/2000 | Humphrey et al. | .......... 375/295 |
| 6,181,714 B1 | * | 1/2001 | Isaksson et al. | ............. 370/491 |
| 6,278,685 B1 | * | 8/2001 | Yonge, III et al. | ........... 370/203 |
| 6,313,738 B1 | * | 11/2001 | Wynn | ..................... 340/310.03 |
| 6,314,146 B1 | * | 11/2001 | Tellado et al. | ............... 375/346 |
| 6,320,903 B1 | * | 11/2001 | Isaksson et al. | ............. 375/232 |

FOREIGN PATENT DOCUMENTS

| | | |
|---|---|---|
| EP | 1 043 874 | 10/2000 |
| WO | WO 98/10550 | 3/1998 |

OTHER PUBLICATIONS

Weilin Liu et al: "Nature of Power Line Medium and Design Aspects for Broadband PLC System", International Zürich Seminar on Broadband Communications, Feb. 15–17, 2000, pp. 185–189.

* cited by examiner

*Primary Examiner*—Ajit Patel
(74) *Attorney, Agent, or Firm*—Lee, Mann, Smith, McWilliams, Sweeney & Ohlson

(57) ABSTRACT

An Orthogonal Frequency Division Multiplexed (OFDM) power line communications system comprising a power line for distributing electricity to a plurality of premises and a communication station coupled to the power line at one of the premises, which station uses a part of the power line external to the premises as a communications medium. The communications station includes a receiver which comprises a clipping system adapted to clip an incoming OFDM data waveform, which includes a regular impulsive noise component, so as to reduce the level of noise on the waveform.

11 Claims, 10 Drawing Sheets

50

POWER LINE COMMUNICATIONS SYSTEM AND METHOD OF OPERATION THEREOF

TECHNICAL FIELD

This invention relates to a power line communication systems and method of operation thereof and in particular to a system and method utilising Orthogonal Frequency Division Multiplexing (OFDM).

BACKGROUND OF THE INVENTION

It is known to transport telecommunications signals over an electricity distribution or power transmission network. Delivering a telecommunications service in this manner is attractive as it avoids the need to install new cabling to each subscriber. By using existing electricity distribution cabling to carry telecommunications signals, significant cost savings are possible. International Patent Application WO94/09572 shows an electricity distribution network that carries telecommunications signals.

There are essentially two known methods for transmitting data over power lines. A first method uses the power signal itself, modifying the shape of the power signal at certain known points in response to the data that is to be carried. An example of this is shown in UK Patent GB 1,600,056. A second method uses a carrier signal having a different frequency from that of the power signal, the carrier signal being modulated by the data.

One of the problems with using power lines as a communications medium is that they are subject to noise and interference. A first type of noise is due to cables picking up radio signals such as broadcast AM radio signals and amateur radio band transmissions. Overhead cables are particularly prone to this type of noise. A second type of electrical noise is due to electrical equipment coupled to the power lines. Electric motors, thermostats and gas discharge lighting are particularly prone to generating noise. Noise propagates along the power lines and combines with communications signals. The level of noise can be high enough, and persist for long enough, to corrupt communications signals.

Noise can impose constraints when using the power line to carry data. The aforementioned patent application WO94/09572 shows an electricity distribution network which carries telecommunications signals and teaches that the amount of noise entering the network from the premises can be reduced by installing conditioning elements at each premises. This requires a considerable amount of work and expense.

Power line transmission is one of several ways for delivering communications to subscriber premises and is therefore sensitive to competition with existing copper wires and more recent alternatives such as optical fibre/coaxial cable delivery and fixed radio access techniques. Therefore, there is a desire to provide a system that is capable of delivering an acceptable quality of service at a cost that is attractive to a subscriber. One of the aspects of a power line transmission system that is particularly sensitive to cost is the customer premises equipment (CPE). The customer premises equipment must be capable of delivering an acceptable quality of service and interfacing to equipment in a subscriber's premises.

A number of different modulation schemes may be used in the provision of data services over power line. The applicant has found a number of schemes to be inappropriate:

Spread spectrum in the context of access by time division is not well matched to this application because of its low spectral efficiency.

High order Quadrature Amplitude Modulation QAM (16 QAM and above) is spectrally efficient but relatively insensitive i.e. it requires a quite high signal to noise ratio for reliable reception.

Binary Phase-Shift Keying BPSK either employing raised cosine filtering or minimum shift keying is not sufficiently spectrally efficient for a robust solution to this application.

However, the applicant believes two schemes to be acceptable, as follows:

Quadrature Phase-Shift Keying QPSK on a single carrier with raised cosine filtering has sufficient spectral efficiency for including significant coding overhead to strengthen the link's robustness. It does however require adaptive equalisation (albeit with very slow adaptation speed requirement) to cope with frequency selective fading.

Orthogonal Frequency Division Multiplexing OFDM with QPSK modulation on the sub-carriers results in a spectral efficiency which is comparable to the above with contiguous frequency allocations. However, this technique is potentially superior in situations where the allocated spectrum is non-uniform and non-contiguous. There is no need for tapped delay line adaptive equalisers; instead, a simple channel compensation algorithm has to be included. Coding is required to make the radio interface robust.

The use of OFDM provides a superior flexibility to fit into non-uniform and non-contiguous frequency allocations, while maintaining reasonable spectral efficiency. This results form the intrinsic nature of OFDM which is composed of a large number of simultaneously transmitted sub-carriers which are staggered in frequency each individually occupying a low bandwidth, as illustrated in FIG. 1.

The scheme's flexibility comes about from the ability to designate which sub-carriers are to be activated and which are not. Regarding spectral efficiency, the signal composition results in an intrinsic spectrum fall-off outside of the active bandwidth commensurate with the bandwidth of each sub-carrier rather than with the total spectrum width. Thus relatively low excess bandwidths can be achieved.

Therefore, the spectral attributes of OFDM represent the major advantage in favour of its selection for use in power line telecommunication systems. However, despite the clear advantages that could be achieved by the use of ODFM or CODFM in power line telecommunications systems there are presently no commercially available power line telecommunications systems which utilise an OFDM or COFDM modulation scheme.

It is submitted that one reason for the non-use commercially at present of OFDM or COFDM is the problem of impulse noise, as mentioned above. The applicant has discovered that large narrow regular spikes of impulsive interference can arise, for example, from fluorescent lights, which can conceivably flood all the sub-carrier demodulators with sufficient noise to prevent reception of complete symbols, as illustrated in FIG. 2. This noise is aligned with mains frequency.

SUMMARY OF THE INVENTION

The present invention seeks to minimise or overcome the above problem, and other problems that will become apparent from the following description.

According to a first aspect of the present invention there is provided an OFDM power line modem receiver comprising a clipping system adapted to clip an incoming OFDM data waveform, which includes a regular impulsive noise component, so as to reduce the level of said noise on the waveform.

Preferably, when the receiver is arranged to receive a coded OFDM signal (COFDM), wherein the clipping level can be altered, enabling the clipping level to be set such that the COFDM signal is not corrupted beyond the error correcting capabilities of the coding scheme utilised while reducing the power in the noise signal thus preventing corruption of the data in the waveform upon detection.

Preferably, the receiver further comprising a Fourier Transform element and a gain control element, wherein the clipping system and the gain control element act upon a received signal prior to its application to the Fourier Transform element.

This prevents the majority of the impulse power spreading across the OFDM frequency cells.

According to a second aspect of the present invention there is provided method of operating an OFDM power line modem receiver comprising the step of clipping an incoming OFDM data waveform, which includes a regular impulsive noise component, so as to reduce the level of said noise in the waveform.

Preferably, the signals are carried over the power line on radio frequency (RF) carriers.

Most preferably, the signals are carried over the power line in the frequency band greater than 1 MHz. Preferably, the signals comprise data packets which are transmitted with a bit rate of at least 500 kbps.

According to a third aspect of the present invention there is provided an OFDM power line communications system comprising:

a power line for distributing electricity to a plurality of premises; and, a communication station coupled to the power line at one of the premises, which station uses a part of the power line external to the premises as a communications medium, the communications station including a receiver comprising a clipping system adapted to clip an incoming OFDM data waveform, which includes a regular impulsive noise component, so as to reduce the level of said noise on the waveform.

Preferably, the communications system is operable to select a bit rate for transmitting/receiving communications signals over the power line from a plurality of different bit rates.

Preferably, the communications system further comprising a management unit, which is responsive to management signals received over the power line.

Operating at this higher frequency band allows data communications to be transmitted at a higher bit rate because of the greater available bandwidth, in the range 2–10 MHz. It has been found to be particularly advantageous to transmit communications signals within the frequency band 2–6 MHz and in particular within the bands 2.2–3.5 MHz and 3.8–5.8 MHz. These bands fall between the medium wave and short wave bands used for broadcast radio transmissions and avoid the radio amateur band at 3.5–3.8 MHz. However, the present invention is not restricted to use within these bandwidths.

The applicant has found that with presently available OFDM systems packet length of around 5 ms, and preferably 2–5 ms offers advantageous results as the packet is long enough to carry a useful data payload and therefore provide a high system throughput, but short enough to statistically have a high chance of fitting between high-level noise bursts. However, it is an advantage of the present invention that longer packet lengths can be used, because of the reduction in noise levels. Thus a larger number of narrower bandwidth channels can be utilised.

Preferred features may be combined as appropriate, and may be combined with any of the aspects of the invention, as would be apparent to a person skilled in the art.

The data that is carried in this system can be used for computer applications such as home working, file transfer, internet access and a wide range of other applications.

BRIEF DESCRIPTION OF THE DRAWINGS

For a better understanding of the invention, and to show by way of example how it may be carried into effect, embodiments will now be described with reference to the accompanying drawings, in which.

DESCRIPTION OF PREFERRED EMBODIMENTS

Before reviewing the application of OFDM or COFDM to power line telecommunications systems the technical field of power line telecommunications will be described in more detail.

Figure 1:
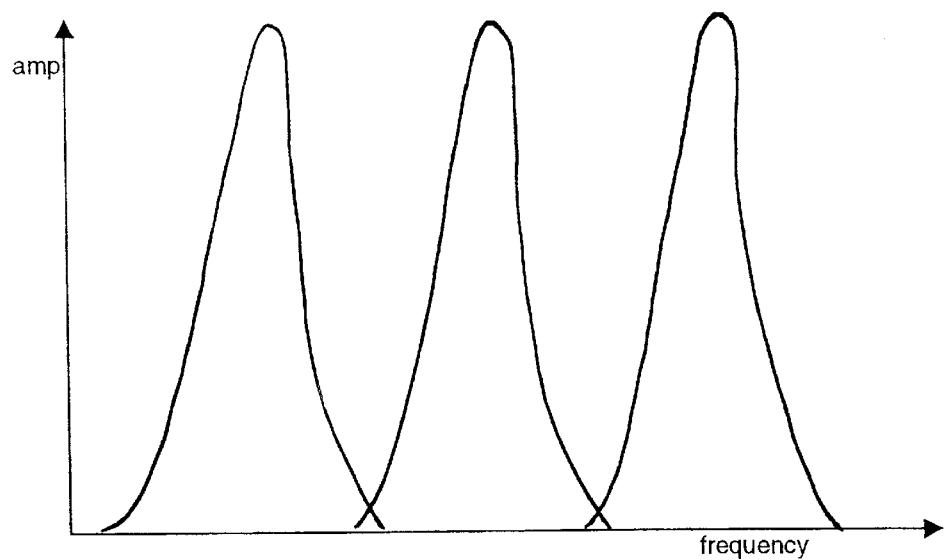
FIG. 1 illustrates a plurality of individual OFDM sub-carriers.
Figure 2:
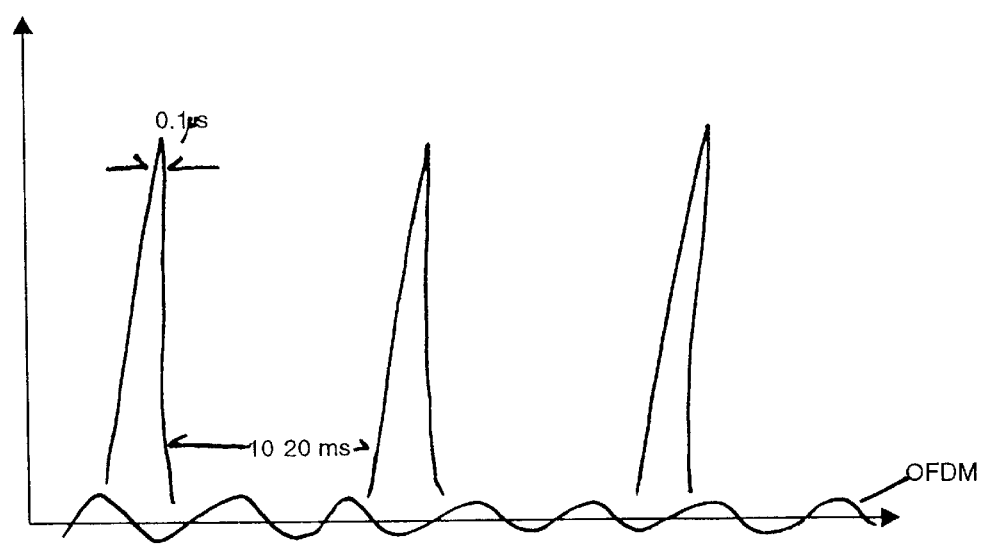
FIG. 2 illustrates data symbols in an OFDM sub-carrier of FIG. 1, including an undesirable impulse noise component.
Figure 3:
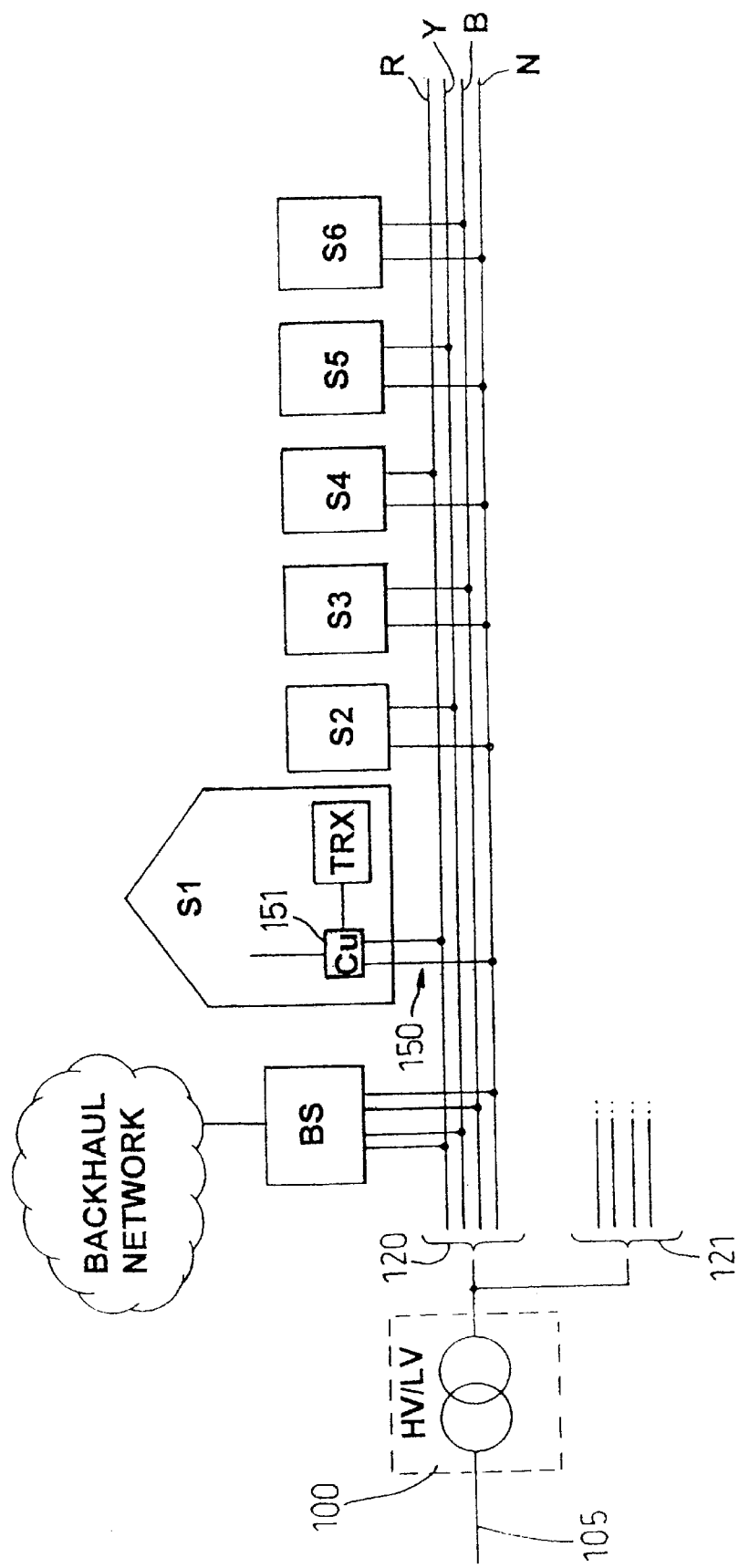
FIG. 3 shows a system for communicating over a power line.

FIG. 3 shows an electricity distribution network which is adapted to carry telecommunications signals. Mains electricity enters the network from an 11 kV or 6.6 kV transmission line 105 and is transformed by substation 100 into a 400V supply which is delivered over distribution cable 120 to customer premises S1 to S6. A substation 100 typically has between 4 and 8 distribution cables of the kind shown as 120, 121 leading from it, each distribution cable serving a number of premises. A distribution cable can extend for several hundreds of meters. Distribution cable 120 comprises blue, red and yellow phase lines and a neutral line. Subscriber communications stations TRX are typically located at houses or businesses. A full system will usually include more than the six premises shown here and will typically include a more elaborate tree-and-branch distribution network. Subscriber premises may receive a single phase electricity supply (230V) or a three-phase electricity supply (400V). Domestic subscriber premises usually receive a single phase supply and neighbouring subscriber premises are usually coupled to different phase lines. In FIG. 1 subscriber S1 is shown coupled to the red phase line, and subscriber S2 is coupled to the yellow phase line. This helps to distribute the load of the network evenly across the three phases.

A base station BS couples data communications signals onto distribution cable 120. The base station can be coupled to one or more distribution cables 120 at a point near to substation 100, as shown in FIG. 1, or it may be coupled to the bus bars at substation 100, the bus bars acting as a star point for serving all of the distribution cables. The communications signals propagate over the cable to transceiver stations at subscriber premises S1 to S6, with a coupling unit CU 151 coupling the communications signals to/from the power line. Subscriber premises couple to a phase line of distribution cable 120 by a branch line 150. In the upstream direction, communications signals are transmitted from the subscriber transceiver stations towards the base station. Communications signals are preferably transmitted between a phase line and neutral or earth.

Figure 4:
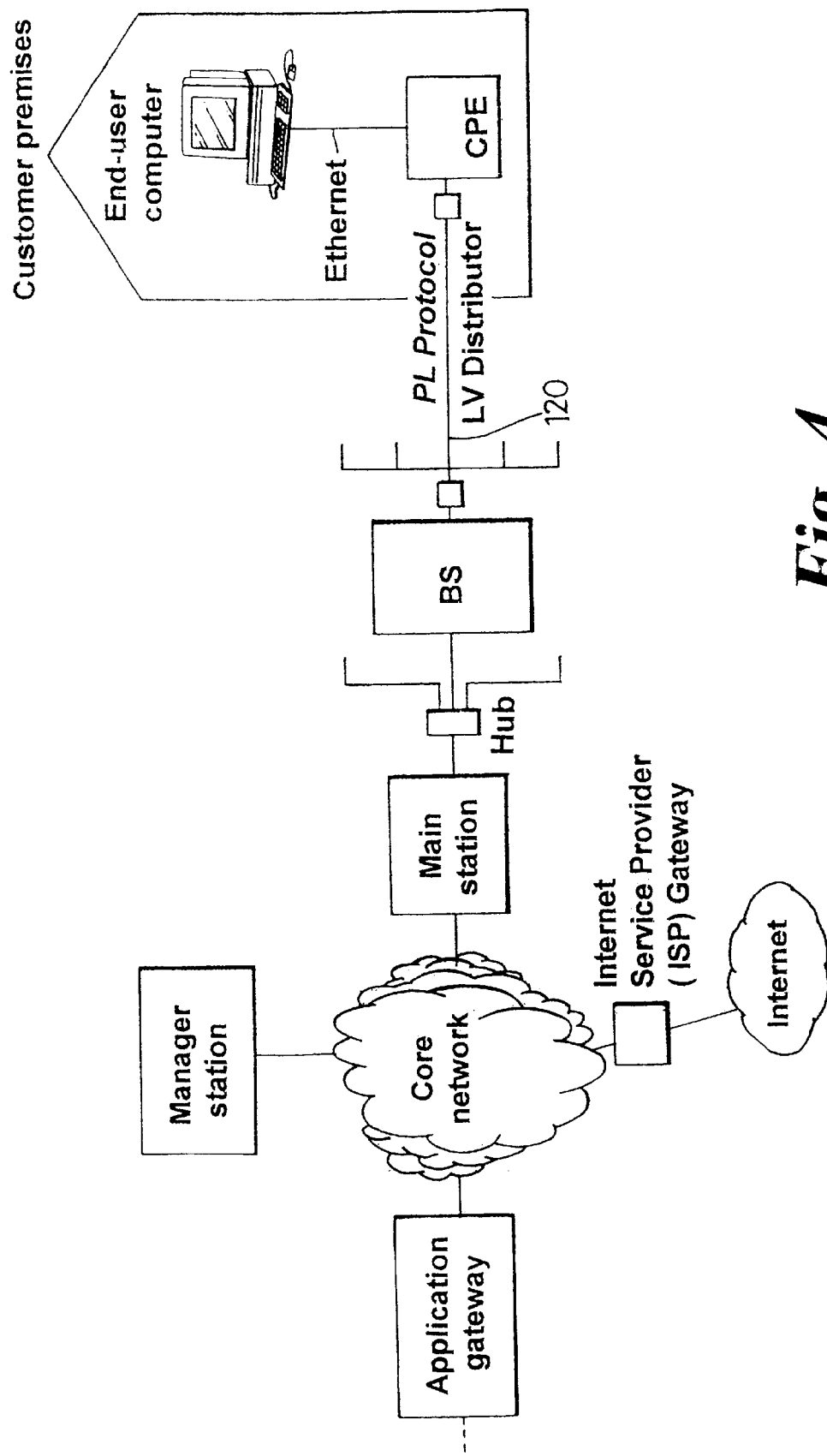
FIG. 4 shows a power line communications network which couples to the system shown in FIG. 1.

FIG. 4 shows a top level diagram of an example power line communications (PL) system configuration. The end-user computer connects to the customer premises equipment (CPE), within the customer premises. The CPE is connected to the power line base station using the power line protocol across the low-voltage LV power line. Communications traffic from multiple base stations accesses the core network through the main station via concentration in a hub, FDDI ring or Ethernet daisy chain. Within the core network a manager station allows remote management of the base stations and CPEs. Intranet and Internet access is available directly or indirectly via the core network, via gateways where appropriate.

Data Transmission

Two frequency bands, referred to as PLT1 and PLT2, are used for power line transmission. These bands are 2.2–3.5 MHz and 4.2–5.8 MHz respectively. The upper and lower limits on each band are defined to minimise interference to (and from) other RF users, in particular medium wave, radio amateurs and short wave radios. The base station supports transmission and reception at both PLT1 and PLT2, providing frequency diversity to overcome any frequency-specific reception difficulties associated with an individual CPE. CPEs can use a tuneable modem to operate on the two bands.

The PL system delivers around 1 Mbps peak bit rate, shared between all CPEs connected to a given Base station. This peak shared bit rate may be reduced, such as to 250 kbps or 500 kbps, or raised depending on available bandwidth and modulation schemes that are used. Reduced bit rates will also be supported to provide service to end-users at the extremes of the system range and end-users with adverse link transmission characteristics.

To compensate for difficult CPE-Base station links (e.g. CPEs at the extremes of transmission range) one or more reduced bit rates can be used.

The bit rate and frequency band for the CPE can be set via control signals from a network management unit.

The range over which a PL link can be reliably maintained is dependent on the loss characteristics of the electricity distribution cable and the noise levels experienced at the receiver. For reliable operation, it is expected that a carrier to (background) noise ratio (CNR) of greater than 10 dB is required.

The use of multiple frequency bands and multiple data rates allows individual CPEs to be configured to best match the transmission characteristics to the customer premises. Where appropriate, such parameters will be capable of being configured across the network from the management system.

The base station supports the same frequency bands and data rates as the CPEs connected to it. When communicating with any CPE, the Base station will automatically switch to the frequency and data rate used by that CPE.

The noise environment on the power line consists of background noise, which is constantly present, comprising mostly broadcast radio carriers; and additionally impulsive noise. The vast majority of impulsive noise bursts are short in duration and will result in the loss of a single packet, which will be resent with minimum impact on the throughput rate available to the user. However, there is a finite probability of more sustained noise bursts lasting up to several seconds in duration. These may, for example, be caused by faulty central heating thermostats. These bursts will interrupt all traffic on the power line for several seconds. In the worst case, these have been found to occur up to five times per hour. In prior art systems there is no way to prevent this interruption, except to replace the faulty electrical equipment which is considered uneconomic. Such prior art PL systems were designed such that the interruptions caused to the service by the noise bursts were kept to a minimum and recovery of service after a burst is immediate. In a system in accordance with the present invention the problem of high levels of impulse noise is addresses, as discussed below.

Figure 5:
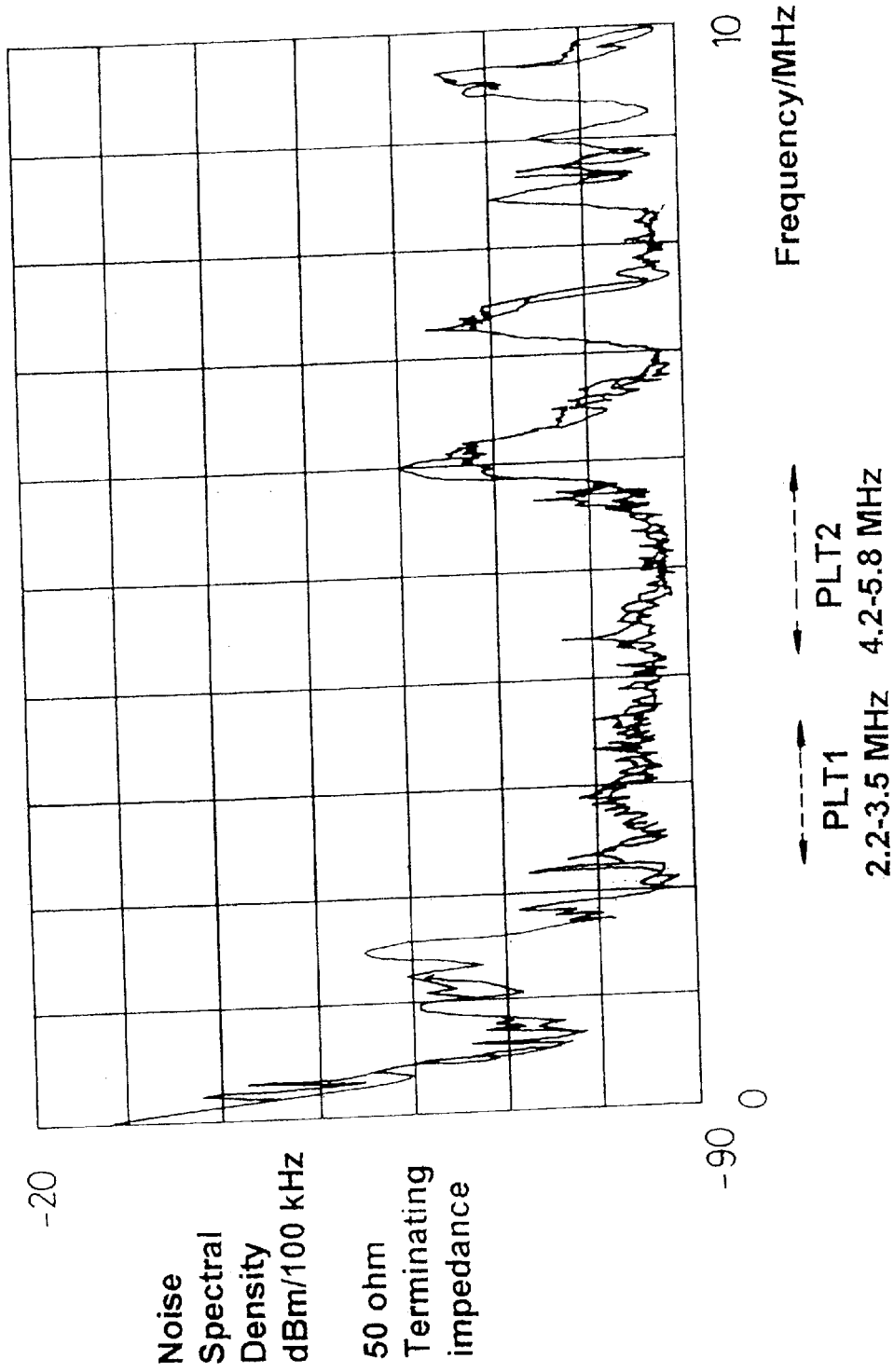
FIG. 5 shows typical background noise on a power line of the type shown in FIG. 1.

FIG. 5 shows typical background noise on an underground power line across the frequency band 0–10 MHz. It has been found to be particularly advantageous to transmit communications signals within the frequency bands 2.2–3.5 MHz (PLT1) and 4.2–5.8 MHz (PLT2). These bands fall between the medium wave and short wave bands used for broadcast radio transmissions and avoid the radio amateur band at 3.5–3.8 MHz. There is a reduced level of background noise in these bands and the radiation of power line communications signals in this frequency band causes minimum interference with radio receiver equipment at subscriber premises. Other frequency bands in the range of, for example, 2–30 MHz can be used although it is preferred to use the lower frequencies because attenuation over the distribution cables is lower.

Figure 6:
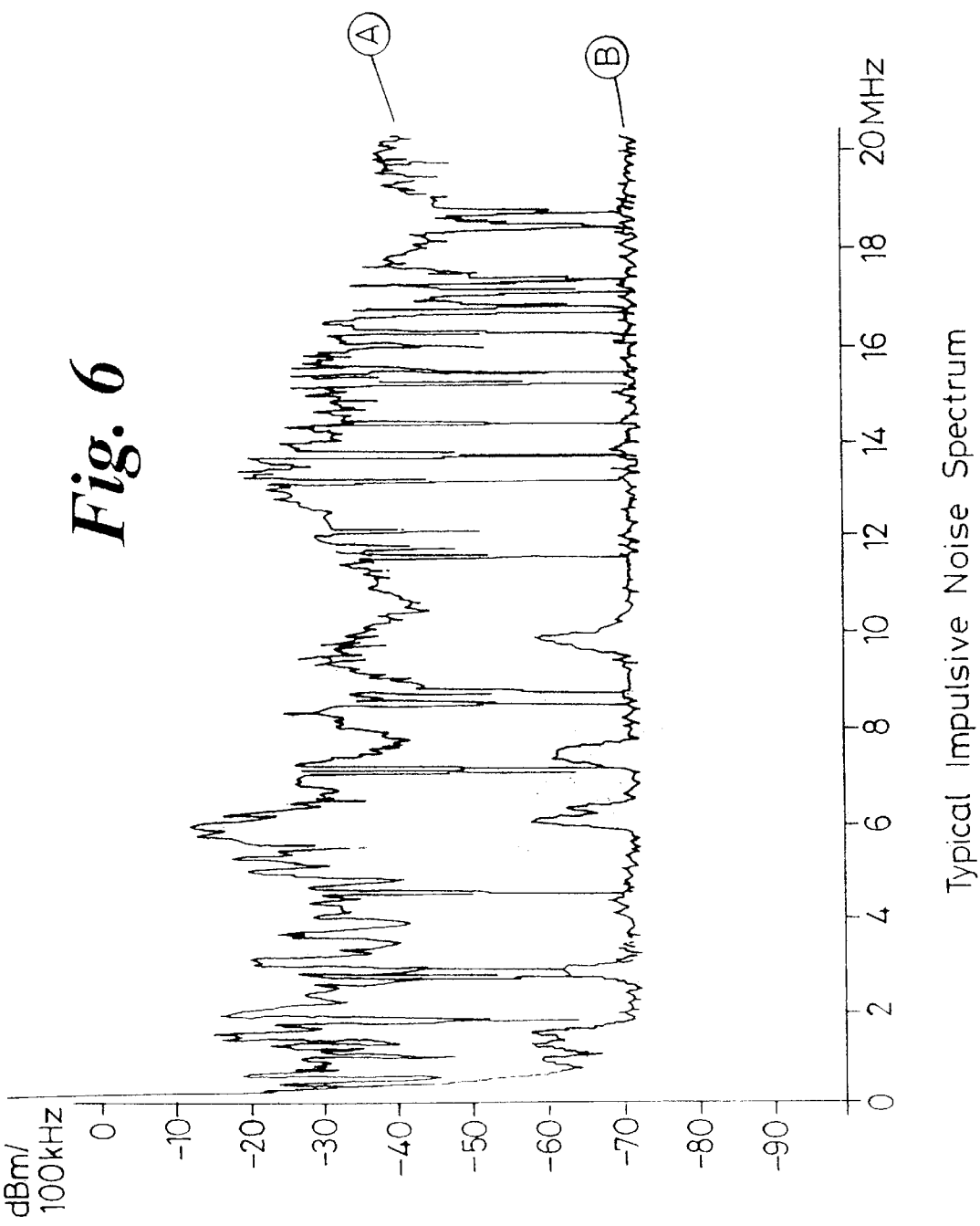
FIG. 6 shows a typical impulsive noise spectrum.
Figure 7:
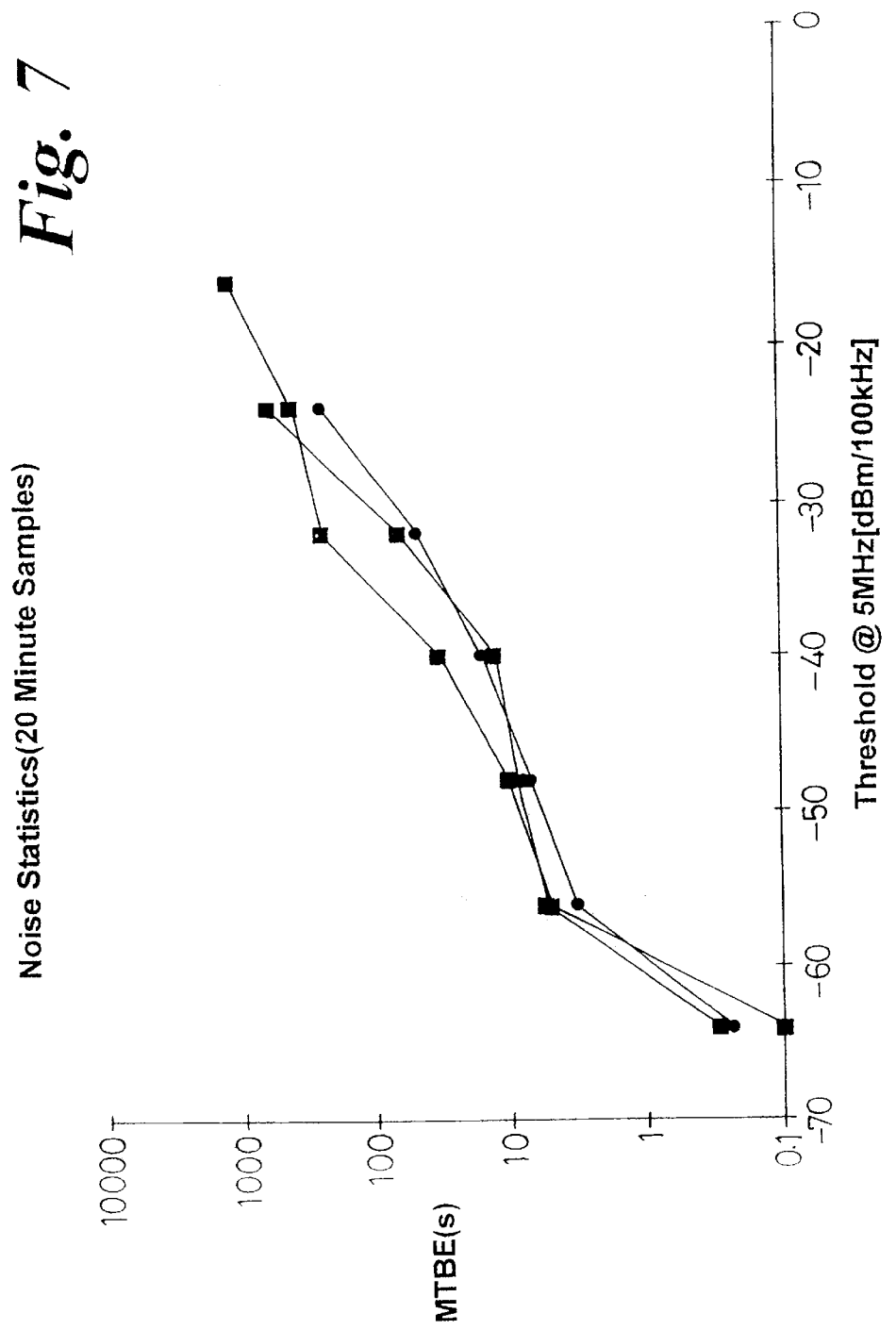
FIG. 7 shows probability of impulsive noise occurring on a power line.
Figure 8:
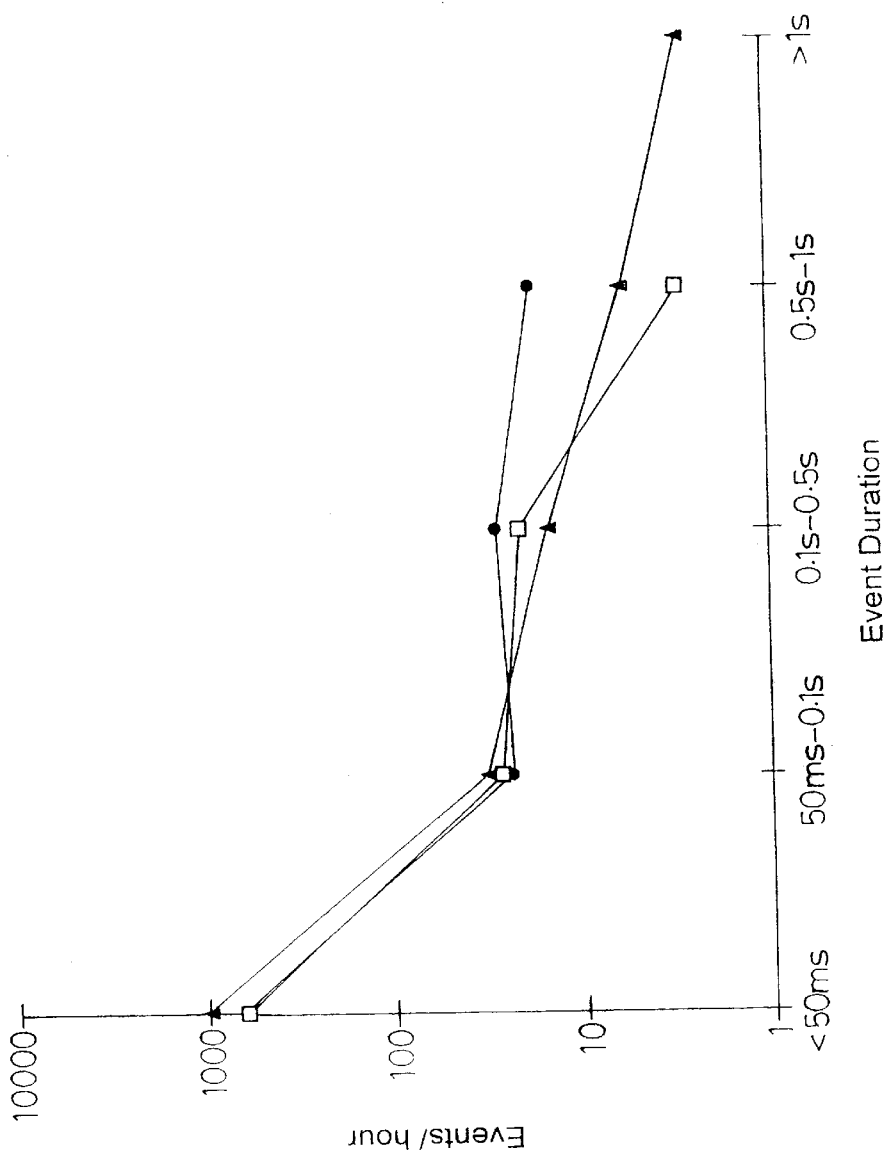
FIG. 8 shows typical duration of impulsive noise bursts.
Figure 9:
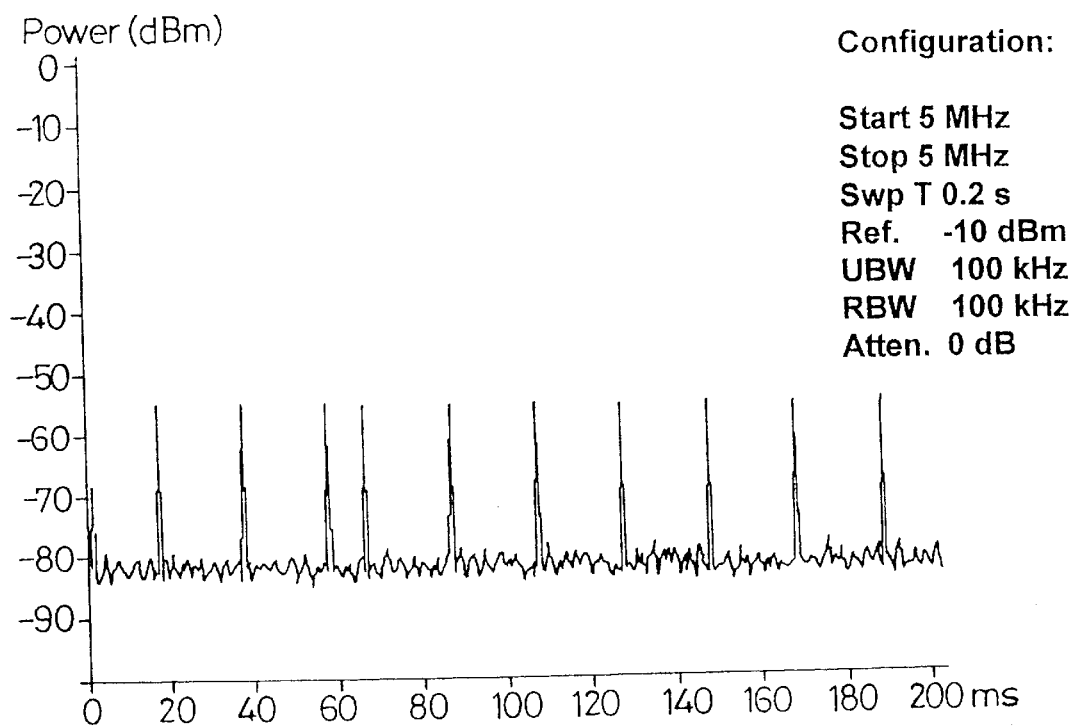
FIG. 9 shows a further example of impulsive noise on a power line.

FIG. 6 shows two spectrum plots (A), (B) of impulsive noise taken at different times. FIG. 7 shows the probability of impulsive noise occurring at various power threshold levels, and FIG. 8 shows the duration of those impulsive noise bursts which cross the −56 dBm power threshold at which the applicant operates. The majority of noise bursts crossing the threshold are less than 1 ms in length. For reliable operation, it is necessary to maintain a carrier to noise ratio of at least 10 dB. FIG. 9 shows another example of impulsive noise that can occur on a power distribution network. This consists of short spikes with a short duty cycle. A short packet length of around 5 ms, and preferably 2–5 ms, has been found to offer good performance as the short length statistically has a high probability of fitting between high-level impulsive noise bursts Data can be transmitted using a variety of line coding or modulation techniques. The applicant uses Quadrature Phase-Shift Keying QFSK modulation. The upstream and downstream transmissions preferably share a common frequency band with the upstream and downstream transmissions occupying different times.

The range over which the link can be reliably maintained is dependent on the loss characteristics of the electricity distribution cable and the noise levels.

Referring again to FIG. 3, it can be seen that stations S1 to S6 are sited at increasingly greater distances from the base station. Signals transmitted to/from a station sited close to the base station, such as station S1, should be attenuated less than the signals transmitted to/from a station sited further away from the base station, such as station S6.

The factors affecting CNR of a signal received at a station are:

(i) attenuation for the path between the transmitting and receiving stations; and, (ii) noise level on the power line.

This generally corresponds to an increasing carrier to noise ratio (CNR) for stations sited progressively closer to the base station.

It is possible to take advantage of this effect by transmitting data at a higher bit rate to those stations sited closer to the base station. This results in an improved data throughput for the system.

Referring again to FIG. 5, two different frequency bands are provided for power line communications. The frequency band that a particular station uses (PLT1 or PLT2) can be selected to provide an optimum communications link. Different stations (on the same or different power lines served by the base station) may require different frequency bands due to the particular noise/interference conditions on the path to that subscriber. Providing a selection of both frequency bands and data rates allows each subscriber station served by a base station to reliably operate at as high a bit rate as possible. While two frequency bands are shown here, it is also possible to provide a larger number of frequency bands.

A variety of conventional local area network protocols, such as, token bus, carrier sense multiple access (CSMA) and polling can be used on the network. The typical peak data rate of the system is in the region of 0.5–2 Mbit/s.

OFDM/COFDM

Figure 10:
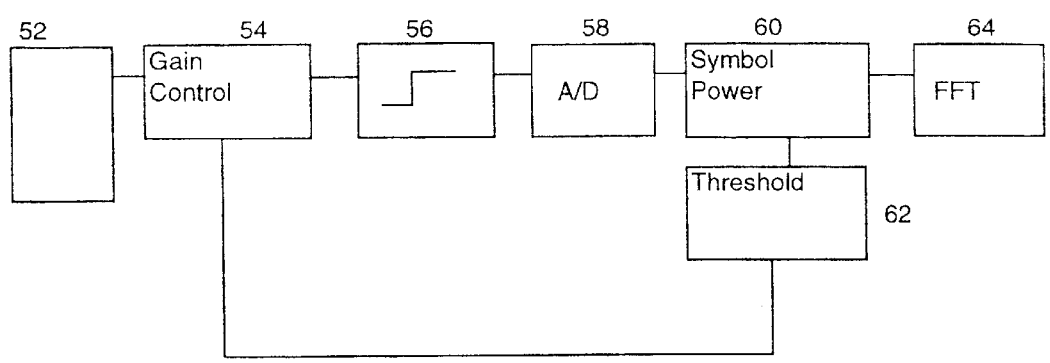
FIG. 10 illustrates a receiver in accordance with the present invention.

FIG. 10 illustrates an OFDM power line modem receiver 50 in accordance with the present invention. The receiver 50 includes a filter element 52, which filters an initially received signal before passing it through a gain control element 54 to hard limiting element 56, which removes a portion of the noise spikes on the signal. The analogue signal is then converted to a digital signal in an A/D converter 58.

An average power estimate across the OFDM symbol is then obtained in an element 60 and a appropriate threshold is determined, in element 62, which results in the removal of as much of the noise spike as is possible without adversely affecting the OFDM symbol. This level is fed back to the gain control element 52. Thus the power estimating element 60, the threshold element 62 and the gain control element 52 act together to create an adaptive threshold for the clipping process. In this way the signal is clipped without corrupting the data beyond the error correcting capabilities of the coding scheme.

The signal output by the power estimating element 60 is then forwarded to a fast Fourier transform element (FFT) 64, which converts the signal back into the frequency domain.

Figure 11:
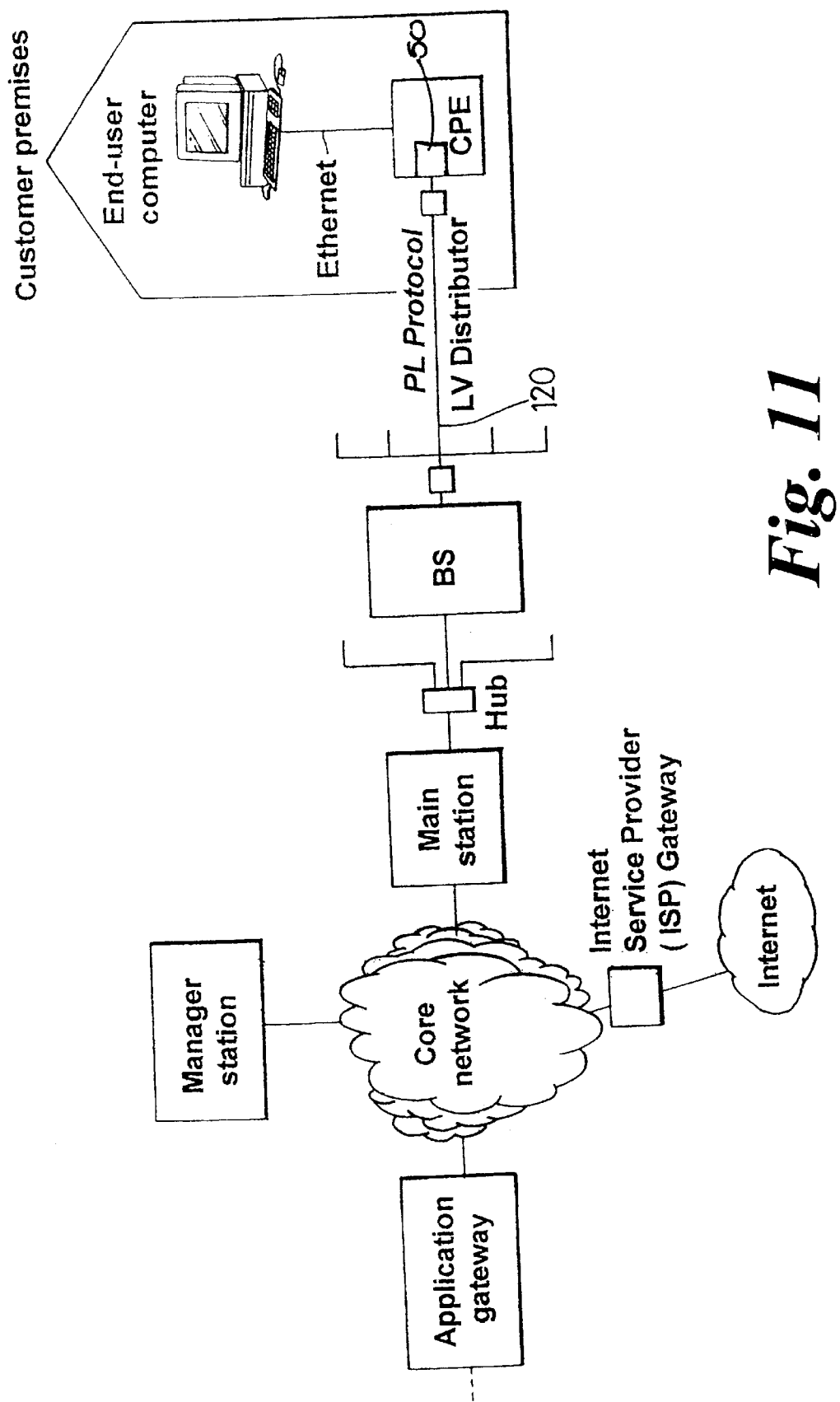
FIG. 11 illustrates an OFDM power line telecommunications system in accordance with the present invention.

FIG. 11 illustrates an OFDM power line telecommunications system in accordance with the present invention, incorporating a modem receiver 50 as discussed above.

Total Bandwidth Coverage

An ideal approach here is to enable full flexibility over the frequency band potentially suitable for digital power line DPL, prior to any specific considerations of permitted frequencies of operation. This would suggest a coverage of 2–10 MHz, i.e. a bandwidth of 8 MHz. Operation over this total bandwidth for a specific case is probably neither necessary nor allowable; for example, using QPSK modulation, a set of sub-carriers with an aggregate span of between 0.5 and 1.5 MHz (depending on the amount of coding employed) would be activated to achieve the target user data rate of 1 Mb/z.

Modifications may be incorporated without departing from the scope or spirit of the present invention, as determined by a person skilled in the art.

What is claimed is:

1. An OFDM power line modem receiver comprising a clipping system adapted to clip an incoming OFDM data waveform, which includes a regular impulsive noise component, so as to reduce the level of said noise on the waveform and further comprising a Fourier Transform element and a gain control element, wherein the clipping system and the gain control element act upon a received signal prior to its application to the Fourier Transform element.

2. The receiver of claim 1, adapted to receive a coded OFDM signal (COFDM), wherein the clipping level can be altered, enabling the clipping level to be set such that the COFDM signal is not corrupted beyond the error correcting capabilities of the coding scheme utilised while reducing the power in the noise signal thus preventing corruption of the data in the waveform upon detection.

3. The method of claim 1 adapted to receive a coded ODFM signal (CODFM), wherein the clipping level can be altered, enabling the clipping level to be set such that the COFDM signal is not corrupted beyond the error correcting capabilities of the coding scheme utilised while reducing the power in the noise signal thus preventing corruption of the data in the waveform upon detection.

4. The method of claim 3 adapted to receive a coded OFDM signal (COFDM), wherein the clipping level can be altered, enabling the clipping level to be set such that the COFDM signal is not corrupted beyond the error correcting capabilities of the coding scheme utilised while reducing the power in the noise signal thus preventing corruption of the data in the waveform upon detections.

5. The method of claim 1, wherein the signals comprise data packets which are transmitted with a bit rate of at least 500 kbps.

6. The method of claim 3, wherein the signals are carried over the power line in the frequency band greater than 1 MHz.

7. The method of claim 3, wherein the signals comprise data packets which are transmitted with a bit rate of at least 500 kbps.

8. The communications system of claim 6, which is operable to select a bit rate for transmitting/receiving communications signals over the power line from a plurality of different bit rates.

9. The communications system of claim 8 adapted to receive a coded OFDM signal (COFDM), wherein the clipping level can be altered, enabling the clipping level to be set such that the COFDM signal is not corrupted beyond the error correcting capabilities of the coding scheme utilised while reducing the power in the noise signal thus preventing corruption of the data in the waveform upon detection.

10. The communications system of claim 8, which is operable to select a bit rate for transmitting/receiving communications signals over the power line from a plurality of different bit rates.

11. The communications system of claim 6, further comprising a management unit, which is responsive to management signals received over the power line.

* * * * *